United States Patent [19]

Showalter

[11] Patent Number: 5,669,460
[45] Date of Patent: Sep. 23, 1997

[54] AUTOMOTIVE TORQUE TRANSFER CASE WITH REDUCED ANGLE FORWARD OUTPUT SHAFT

[75] Inventor: Dan Joseph Showalter, Plymouth, Mich.

[73] Assignee: Borg-Warner Automotive, Inc., Sterling Heights, Mich.

[21] Appl. No.: 416,254

[22] Filed: Apr. 4, 1995

[51] Int. Cl.[6] .................................................. B60K 17/344
[52] U.S. Cl. .................. 180/233; 74/665 H; 74/665 GE; 74/665 F; 464/147
[58] Field of Search .................................. 180/233, 247, 180/248, 249, 250, 376, 383; 74/665 F, 665 H, 665 T, 665 GA, 665 GE, 665 G, 416; 464/147, 182, 170

[56] References Cited

U.S. PATENT DOCUMENTS

| | | | |
|---|---|---|---|
| 2,111,693 | 3/1938 | Schnuck | 74/665 GA |
| 2,195,479 | 4/1940 | Buchner | 180/233 |
| 2,924,985 | 2/1960 | Crankshaw | 74/416 |
| 4,103,753 | 8/1978 | Holdeman | 180/247 |
| 4,289,213 | 9/1981 | Seaman | 180/233 |
| 4,303,400 | 12/1981 | Yano et al. | 74/416 |
| 4,458,557 | 7/1984 | Hayakawa | 74/665 GE |
| 4,632,207 | 12/1986 | Moore | 180/247 |
| 4,651,847 | 3/1987 | Hermanns | 180/245 |
| 4,860,612 | 8/1989 | Dick et al. | 74/665 H |
| 4,989,686 | 2/1991 | Miller et al. | 180/197 |

Primary Examiner—Brian L. Johnson
Assistant Examiner—Peter C. English
Attorney, Agent, or Firm—Brinks, Hofer, Gilson & Lione; Greg Dziegielewski

[57] ABSTRACT

A transfer case (10) having a drive shaft (12) on a bearing (18) to permit the drive shaft to be rotated with respect to the transfer case, the drive shaft having a free end portion (12a) which is adapted to drive an axle of a vehicle. The drive shaft passes through a sleeve (20), and bearings (22, 24) are provided to permit the sleeve to be rotated with respect to the transfer case. The sleeve has a sprocket (14) affixed to it, and the sprocket is caused to rotate by an endless chain (16). The sleeve is drivingly connected to the drive shaft by a universal joint (26), preferably a cardan joint, which is contained within an enlarged end portion (20a) of the sleeve. The sprocket is positioned between the universal joint and the free end portion of the drive shaft, to maximize the distance therebetween, and thereby minimize the included angle required of the universal joint.

12 Claims, 1 Drawing Sheet

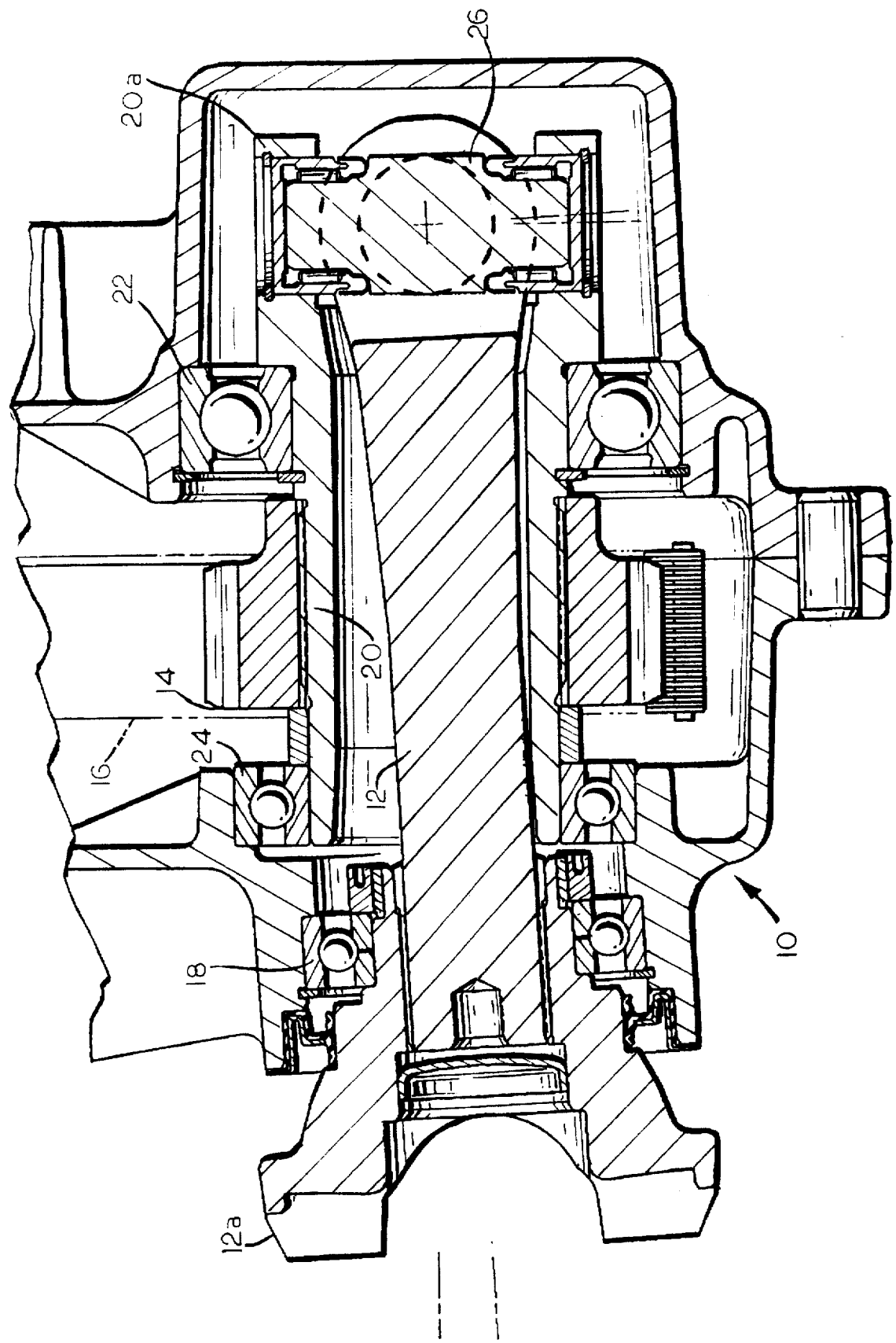

AUTOMOTIVE TORQUE TRANSFER CASE WITH REDUCED ANGLE FORWARD OUTPUT SHAFT

FIELD OF THE INVENTION

This invention relates to a transfer case for transferring torque to a plurality of drive axles of an automotive vehicle. More particularly, this invention relates to a transfer case whose forwardly extending output or propeller shaft has a reduced included angle with respect to the axes of rotation of the other rotatable shafts of the transfer case.

BACKGROUND OF THE INVENTION

U.S. Pat. No. 4,103,753 (J. W. Holdeman) describes a power transfer device of a type which is suited for use as a torque transfer case in an automotive vehicle. Such a transfer case serves to transmit torque from an engine or prime mover of the vehicle to a plurality of drive axles, to thereby drive front and rear pairs of vehicle wheels.

U.S. Pat. No. 4,289,213 (R. L. Seaman) describes a transfer case of the foregoing type which utilizes a cardan-type universal joint within the transfer case itself, in combination with an external cardan-type universal joint, to transmit torque to an output or propeller shaft extending forward from the transfer case for driving the forward axle of the vehicle. The invention of the aforesaid U.S. Pat. No. 4,289,213 made it possible to reduce the included angle that exists between the parallel axes of rotation of the other rotating shafts of the transfer case and the axis of rotation of the output shaft for driving the driven front axle, relative to the included angle which would exist in an arrangement utilizing only a pair of external cardan-type universal joints. Any such reduction in an included angle in an automotive transfer case output shaft is beneficial in reducing vibrations with the suspension system of the vehicle and in increasing the useful life of the universal joint components, and further may permit a beneficial simplification in the design, and thereby a reduction in the manufacturing cost, of the universal joint.

The disclosures of the aforesaid U.S. Pat. Nos. 4,103,753 and 4,289,213 are incorporated herein by reference.

SUMMARY OF THE INVENTION

According to the present invention there is provided an improved transfer case with respect to that of the aforesaid U.S. Pat. No. 4,289,213 by virtue of a further reduction in the included angle between the front output shaft and the other rotating shafts, that would otherwise exist in a given vehicle/transfer case configuration. Such reduction, in a transfer case of the present invention, is obtained by reversing the position of the gear or other drive member that transmits torque to the forward output shaft relative to an internal cardan-type joint. Thus, by putting the cardan joint for the forward output shaft rearward of the drive member, as opposed to forward of the drive member in accordance with the teachings of U.S. Pat. No. 4,289,213, the length of the drive axis from the cardan joint to the forward axle of the vehicle is increased, thereby reducing the included angle of such drive axis.

The reversal of the positions of the drive member and the cardan joint for the forward drive shaft of a transfer case is accomplished by extending the forward output shaft through an annulus in the driving member. This repositioning further permits the use of larger cardan joints in the transfer case because such joints will then be positioned at a location which will not interfere with the linkage connections normally encountered in the region of the front of an automotive transfer case.

Accordingly, it is an object of the present invention to provide an improved transfers case for transmitting torque from a prime mover to a pair of spaced apart driven members. More particularly, it is an object of the present invention to provide a transfer case of the foregoing character which reduces the included angle of the axis of the shaft for transmitting torque to the forward axle of a vehicle relative to the axes of the other rotating shafts of the transfer case of the vehicle for a given vehicle/transfer case configuration.

For a further understanding of the present invention and the objects thereof, attention is directed to the drawing and the following brief description thereof, to the detailed description of the preferred embodiment of the invention and to the appended claims.

IN THE DRAWING

The only FIGURE of the drawing is an elevational view, in cross-section, of a portion of a torque transfer case for an automotive vehicle, the illustrated portion including the output or propeller shaft for transmitting torque to the front or forward axle of the vehicle.

DETAILED DESCRIPTION OF THE PREFERRED EMBODIMENT

A torque transfer case for an automotive vehicle a portion of which is indicated generally by reference numeral 10 in the drawing, serves various functions including the function of transmitting torque to a propeller or drive shaft 12. The drive shaft 12 serves to drive the front axle, not shown, of the vehicle, also not shown, that incorporates the transfer case 10.

Torque is imparted to the drive shaft 12 from other portions of the transfer case 10, not shown, through an annular sprocket 14, which is rotatably driven by an endless chain 16 or other driving member, shown schematically, the drive shaft 12 being rotatably supported relative to the transfer case by a bearing 18. The sprocket 14 is keyed or otherwise secured to a sleeve 20, which is rotatably secured to the transfer case 10 by a spaced apart pair of bearings 22, 24 that are positioned on opposite sides of the sprocket 14. The sleeve 20 has an enlarged free end portion 20a spaced on the opposed side of the sprocket 14 from a free end portion 12a of the drive shaft 12, the free end portion 12a, which is in the form of a separate yoke that is connected to the drive shaft 12 by a spline connection, being adapted to drive the front axle, not shown, of a motor vehicle.

The longitudinal central axis of rotation of the sleeve 20 extends parallel to the other rotating shafts, not shown, of the transfer case 10, but it is desired to permit the drive shaft 12 to be driven about an axis that does not extend parallel to the axes of rotation of the other rotating shafts. To accommodate such an angular deviation in the angle of rotation of the drive shaft 12, a universal joint 26, preferably a constant velocity universal joint such as a cardan joint, is included in the enlarged end portion 20a of the sleeve 20. The input portion of the universal joint 26 is a driving member which is driven by the sleeve 20, and the output portion of the universal joint 26 is a driven member which drives the drive shaft 12, the drive shaft 12, thus, extending through the annulus of the sprocket 14.

The positioning of the universal joint 26 on the opposite side of the sprocket 14 from the free end 12a of the drive shaft maximizes the distance between the universal joint 26 and the free end portion 12a of the drive shaft 12. This reduces the required included angle between the axis of rotation of the drive shaft 12 and the other rotating shafts of the transfer case relative to the counterpart included angle in the arrangement of the aforesaid U.S. Pat. No. 4,289,213, where the internal cardan joint (72) and the propeller shaft (26) are on the same side of the driving pulley (64). The reduction in the required included angle by the arrangement of this invention in many cases will permit a single cardan joint to be used in places where a double cardan joint would otherwise be required.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. A transfer case (10) comprising:

a drive shaft (12) having a free end portion (12a) that is adapted to drive an axle of a vehicle;

first bearing means (18) for permitting said drive shaft to rotate with respect to said transfer case;

a sleeve (20) surrounding at least a portion of said drive shaft, said at least a portion not including said free end portion;

a chain sprocket (14) disposed on said sleeve for rotatably driving said sleeve;

universal joint means (26) connecting said sleeve to said drive shaft for rotatably driving said drive shaft, said chain sprocket being positioned between said universal joint means and said free end portion of said drive shaft; and second bearing means (22, 24) disposed between said universal joint means and said first bearing means for permitting said sleeve to rotate with respect to said transfer case.

2. A transfer case according to claim 1 wherein said second bearing means comprises first and second bearings, said chain sprocket being positioned between said first and second bearings.

3. A transfer case according to claim 1 wherein said universal joint means comprises a single constant velocity universal joint.

4. A transfer case according to claim 1 wherein said sleeve comprises a free end portion (20a) and wherein said universal joint means is contained in said free end portion of said sleeve.

5. A transfer case according to claim 1 further comprising:

endless chain means (16) for imparting rotational motion to said sprocket.

6. A transfer case drive comprising, a housing (10), a pair of spaced apart bearings (22, 24) disposed in said housing, a drive sleeve (20) rotatably supported by said pair of bearings and having one (20a) end extending beyond one (22) of said pair of bearings, a drive sprocket (14) disposed between said bearings and drivingly coupled to said sleeve, a drive shaft (12) disposed within said drive sleeve and having a first end (12a) extending beyond an other (24) of said pair of bearings and a second end adjacent said one end of said drive sleeve, a bearing (18) disposed adjacent said other of said pair of bearings and rotatably supporting said first end of said drive shaft, and a universal joint (26) connecting said one end of said drive sleeve and said second end of said drive shaft.

7. A transfer case according to claim 6 wherein said universal joint comprises a single constant velocity universal joint.

8. A transfer case according to claim 6 wherein said drive sprocket includes teeth for engaging a chain (16).

9. A transfer case comprising, a housing (10), a pair of spaced apart bearings (22, 24) disposed in said housing, a drive sleeve (20) rotatably supported on a first axis by said pair of bearings and having one end (20a) extending beyond one (22) of said pair of bearings, an annular drive member (14) disposed between said bearings and drivingly coupled to said sleeve, a drive shaft (12) disposed within said drive sleeve on a second axis distinct from said first axis and having a first end (12a) extending beyond an other (24) of said pair of bearings and adapted to drive an axle of a vehicle and a second end adjacent said one end of said drive sleeve, a bearing (18) disposed adjacent said other of said pair of bearings and rotatably supporting said first end of said drive shaft, and a universal joint (26) connecting said one end of said drive sleeve and said second end of said drive shaft.

10. A transfer case according to claim 9 wherein said first axis and said second axis are fixed relative to one another.

11. A transfer case according to claim 9 wherein said universal joint comprises a single constant velocity universal joint.

12. A transfer case according to claim 9 wherein said annular drive member defines a chain sprocket.

* * * * *